No. 834,579. PATENTED OCT. 30, 1906.
R. J. KIDENEY.
NUT LOCK.
APPLICATION FILED JUNE 24, 1905.

Witnesses:—
R. W. Rumer.
C. B. Hornbeck

Inventor,
R. J. Kideney,
By Wilhelm, Parker and Hard,
Attorneys.

UNITED STATES PATENT OFFICE.

ROBERT J. KIDENEY, OF BUFFALO, NEW YORK.

NUT-LOCK.

No. 834,579.  Specification of Letters Patent.  Patented Oct. 30, 1906.

Application filed June 24, 1905. Serial No. 266,738.

*To all whom it may concern:*

Be it known that I, ROBERT J. KIDENEY, a citizen of the United States, residing at Buffalo, in the county of Erie and State of New York, have invented a new and useful Improvement in Nut-Locks, of which the following is a specification.

This invention relates to improvements in locking devices for nuts, and has for one object to provide a simple and economical means of locking the nut in position upon the bolt in such a manner that the same cannot be removed without destroying the bolt.

It has been found in use that the locking devices heretofore constructed are expensive to manufacture and in a short time become inoperative through rust and wear. They can also be readily released when desired, and this renders it possible for malicious persons to easily remove the nuts, and thereby cause serious damage. Their construction is also such that the device or locking portion thereof is more or less exposed, so that when used out of doors the water and moisture have ready access thereto and cause the same to quickly rust and wear away.

Another object of this invention is to so construct the locking device that when the nut is secured in position on the bolt the locking device is concealed within the nut and is therefore inaccessible and cannot be operated to release the nut. It is also fully protected by the nut from the action of water and moisture, and therefore does not easily become rusted and inoperative.

Figure 1:
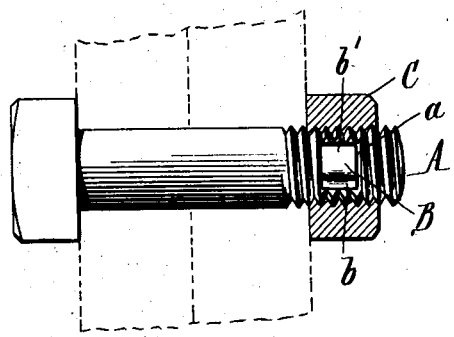
Figure 2:
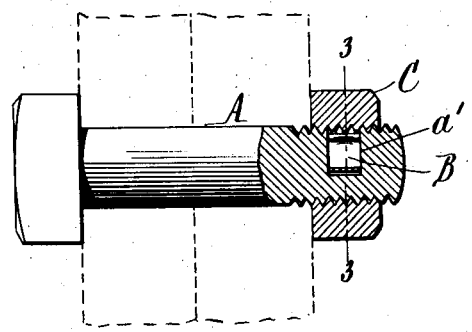
Figure 6:
Figure 3:
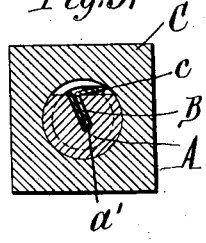
Figure 5:
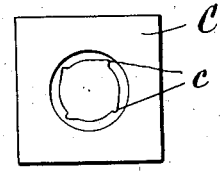
Figure 4:
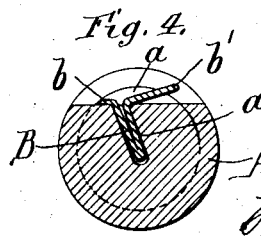

In the accompanying drawings, Figure 1 is a side elevation of a bolt provided with a nut-lock embodying the invention with a nut in position on the bolt shown in section. Fig. 2 is a longitudinal sectional elevation of the same. Fig. 3 is a cross-sectional elevation of the same in line 3 3, Fig. 2. Fig. 4 is an enlarged cross-section of the bolt and nut-lock. Fig. 5 is an end view of the nut. Fig. 6 is a perspective view of the locking-spring detached.

Like letters of reference refer to like parts in the several figures.

A represents a threaded bolt, the threads of which are cut away for a short distance on one side to form the flat segmental pocket $a$. A longitudinal slot $a'$ is formed in the bolt of the length of this pocket $a$ and at an angle thereto. In this slot $a'$ is secured the lock-spring B. This spring consists of a V-shaped piece of metal having upper arms or ends $b\ b'$ extending laterally in opposite directions, one of said ends $b'$ being considerably longer than the other. The lower portion of the spring is forced into the slot $a'$ and is held in position therein by the pressure of its sides against the side walls of the slot. The shorter arm $b$ of the spring rests snugly against the flat bottom of the pocket, while the longer arm $b'$ extends at an upward inclination laterally or transversely of the bolt, so that its end encounters and presses against the threads of the nut C when the nut is screwed upon the bolt over the spring.

On the inner circumference of the nut C are longitudinally-extending grooves $c$, formed in the threads of the nut. The spring-arm $b'$ is arranged so that it extends at an angle in the direction of the movement of the nut when the same is being screwed upon the bolt. The arm therefore slides readily over the grooves $c$ in the nut and does not prevent the screwing up of the nut. When, however, it is attempted to turn the nut in the opposite direction and remove the same, the spring-arm $b'$ at once engages one of the grooves $c$ and prevents further movement.

It is obvious that the angle of the slot $a'$ and of the extending arms $b\ b'$ can be changed as desired and that the spring can be secured in the slot by various means. I therefore do not desire to limit myself to the particular form of spring and method of attachment shown, as any spring secured to the bolt and having an arm or portion extending laterally and upwardly or away from the bolt could be used.

In applying this locking device to a bolt it is desirable to place the same at the point on the bolt at which it is intended the nut shall come to rest when screwed into position. This point can be readily determined in the case of all bolts which are made for special purposes. In other cases washers and nuts of greater thickness can be employed to prevent the nut from being screwed beyond the locking device. It is obvious, also, that, if desired, several locking devices might be arranged at different points along the same bolt. It is also possible, instead of employing a narrow slot and spring, as shown in the drawings, to construct the slot and spring of much greater length, so that the same will extend for some distance longitudinally along the bolt. This would permit a much greater adjustment of the nut. In such a construction, however, it is desirable to increase the length of the nut accordingly or place washers between the nut and the part through which the bolt passes, as otherwise the nut may be screwed such a distance on the bolt that the outer end of the spring will become exposed. This would cause the spring to rust and would also permit the same to be tampered with to unlock and remove the nut.

I claim as my invention—

1. In a nut-locking device, the combination with a nut having internal grooves and a bolt, of a nut-locking spring having a portion secured in the bolt and a free arm which extends in a direction transversely of the bolt and inclines away from the same and is adapted to engage with its end edge in said grooves of the nut to hold the latter from unscrewing, said spring being of less width than the nut and being so located as to be completely covered and protected by the nut when the same is screwed home, substantially as set forth.

2. In a nut-locking device, the combination with a nut having internal grooves, of a bolt having a segmental portion thereof removed forming a recess and a pocket leading inwardly from said recess toward the axis of the bolt in a substantially radial direction, said recess and pocket being arranged intermediate of the ends of the bolt, and a locking member having a double spring portion held in the pocket and retained therein by frictional contact with the side walls of the same, and having a portion forming a detent extending at an angle to the double portion and designed to engage with the said grooves, substantially as set forth.

3. In a nut-locking device, the combination with a nut having internal grooves, of a bolt having a segmental portion removed forming a recess and a pocket leading inwardly therefrom substantially to the axis of the bolt and in a substantially radial direction, said recess and pocket being located a distance from the ends of the bolt, and a locking member comprising a spring-strip having its intermediate portion doubled and inserted within the pocket and one end projecting at an angle to the double portion with its end edge in position to engage with the grooves in the nut, substantially as set forth.

Witness my hand this 16th day of June, 1905.

ROBERT J. KIDENEY.

Witnesses:
EDWARD C. HARD,
A. L. McGEE.